July 22, 1952 F. B. BLAKE 2,604,540
CALLING LINE IDENTIFICATION FOR AUTOMATIC TICKETING SYSTEMS
Filed Sept. 13, 1949 13 Sheets-Sheet 2

INVENTOR
F.B. BLAKE
BY P. C. Smith
ATTORNEY

July 22, 1952            F. B. BLAKE            2,604,540

CALLING LINE IDENTIFICATION FOR AUTOMATIC TICKETING SYSTEMS

Filed Sept. 13, 1949            13 Sheets—Sheet 4

INVENTOR
F. B. BLAKE
BY
P. C. Smith
ATTORNEY

July 22, 1952            F. B. BLAKE            2,604,540

CALLING LINE IDENTIFICATION FOR AUTOMATIC TICKETING SYSTEMS

Filed Sept. 13, 1949            13 Sheets-Sheet 7

INVENTOR
F.B. BLAKE
BY
P.C. Smith
ATTORNEY

INVENTOR
F.B. BLAKE
BY P.C. Smith
ATTORNEY

INVENTOR
F. B. BLAKE
BY P. C. Smith
ATTORNEY

INVENTOR
F.B. BLAKE
BY
P.C. Smith
ATTORNEY

INVENTOR
F. B. BLAKE
BY
P. C. Smith
ATTORNEY

Patented July 22, 1952

2,604,540

UNITED STATES PATENT OFFICE 2,604,540

CALLING LINE IDENTIFICATION FOR AUTOMATIC TICKETING SYSTEMS

Foster B. Blake, Mountain View, N. J., assignor to Bell Telephone Laboratories, Incorporated, New York, N. Y., a corporation of New York Application September 13, 1949, Serial No. 115,425

8 Claims. (Cl. 179—18)

This invention relates to calling line identification in automatic telephone systems.

The present invention is disclosed as an improvement over such systems as disclosed in the copending application of J. W. Gooderham, Serial No. 448,782, filed June 27, 1942, entitled "Automatic Toll-Ticketing System." However, the present invention is applicable to other types of automatic telephone systems where line identification is required, and is not necessarily limited to the preferred embodiment.

In the system shown in the Gooderham disclosure illustrative of the prior art, an idle identifier is seized by an extended connection for the purpose of identifying the directory number and class of service of the calling line. Each identifier is provided with a source of alternating current of the same frequency. A seized identifier applies the tone to a conductor of the extended connection extending back to the calling line. A circuit common to all lines and common to all identifiers is arranged to collect all conductors of lines assigned to a particular group (the lines are, for instance, divided into ten groups of lines) and is arranged to energize distinguishing means for each group in response to signal current flowing in a conductor of any line of the group allocated to said means. Under such circumstances, in order for identifiers to identify the group within which the associated calling line is assigned, it is necessary to exclude all but one identifier from connection with such common circuit during a particular group identification; otherwise, a false identification might, and probably would, be registered in the identifier. Such an arrangement, as will be apparent, limits the amount of traffic which can be handled by identifier from connection with such common circuit access to the common circuit to one at a time.

The main purpose of the present invention is to alleviate the above-mentioned traffic problem by making it possible for any number of seized identifiers to make group identification concurrently without mutual interference. Such purpose is accomplished as described hereinafter with reference to the preferred embodiment, by providing each identifier with a different frequency of current and with mutually exclusive filtering arrangements such that two or more identifiers may concurrently identify different calling lines within the same or different groups. Such an arrangement eliminates the limitation on the traffic handling capacity of such identification systems as disclosed by Gooderham.

Other features of the present invention will be apparent from the detailed description set forth hereinafter of the preferred embodiment thereof and from the claims appended to such detailed description.

The invention having been described in a general manner, reference now may be had to the following detailed description thereof taken in connection with the accompanying drawings in which.

Figure 1:
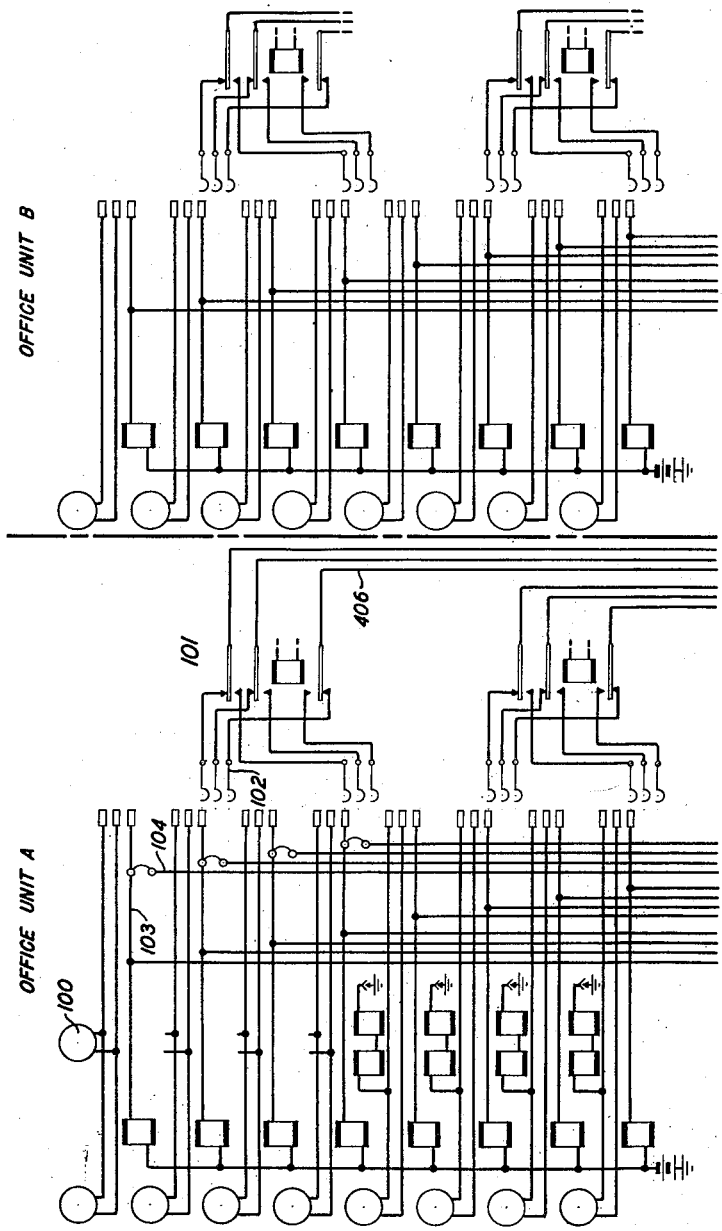
Fig. 1 shows schematically in the left portion thereof a plurality of line finders of one office unit of an office building, each of said line finders serving 200 lines, and a plurality of said lines terminating in different banks and bank levels thereof; in the right portion of this figure is shown a plurality of line finders and lines of a second office unit located in the same building.
Figure 2:
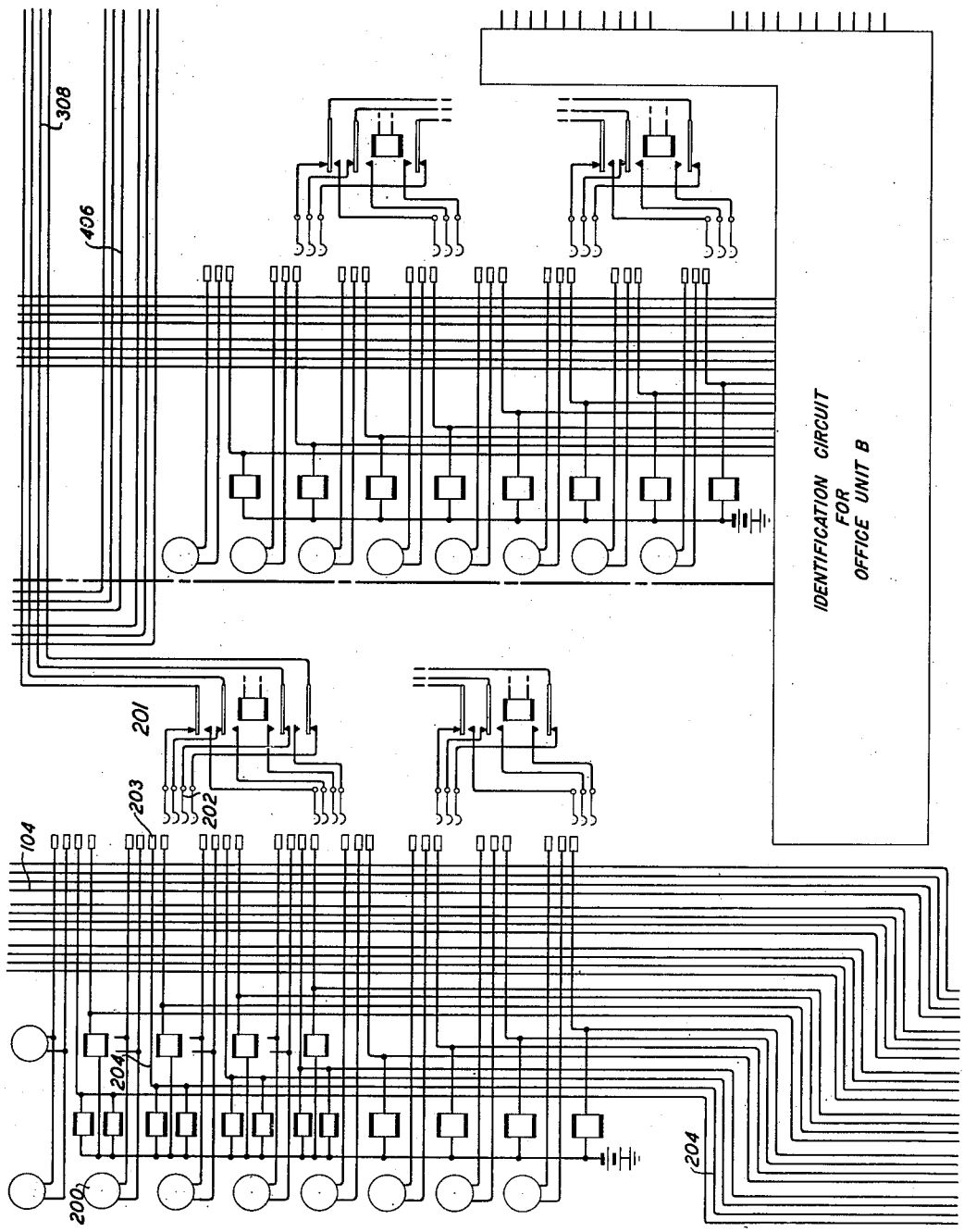
Fig. 2 shows schematically in the left portion thereof a plurality of additional line finders and lines of the first office unit and in the right portion thereof, additional line finders and lines of the second office unit and a box indicative of the thousands number circuits which may be allocated to the second office unit corresponding to the circuits disclosed in Figs. 6 to 8, inclusive.
Figure 3:
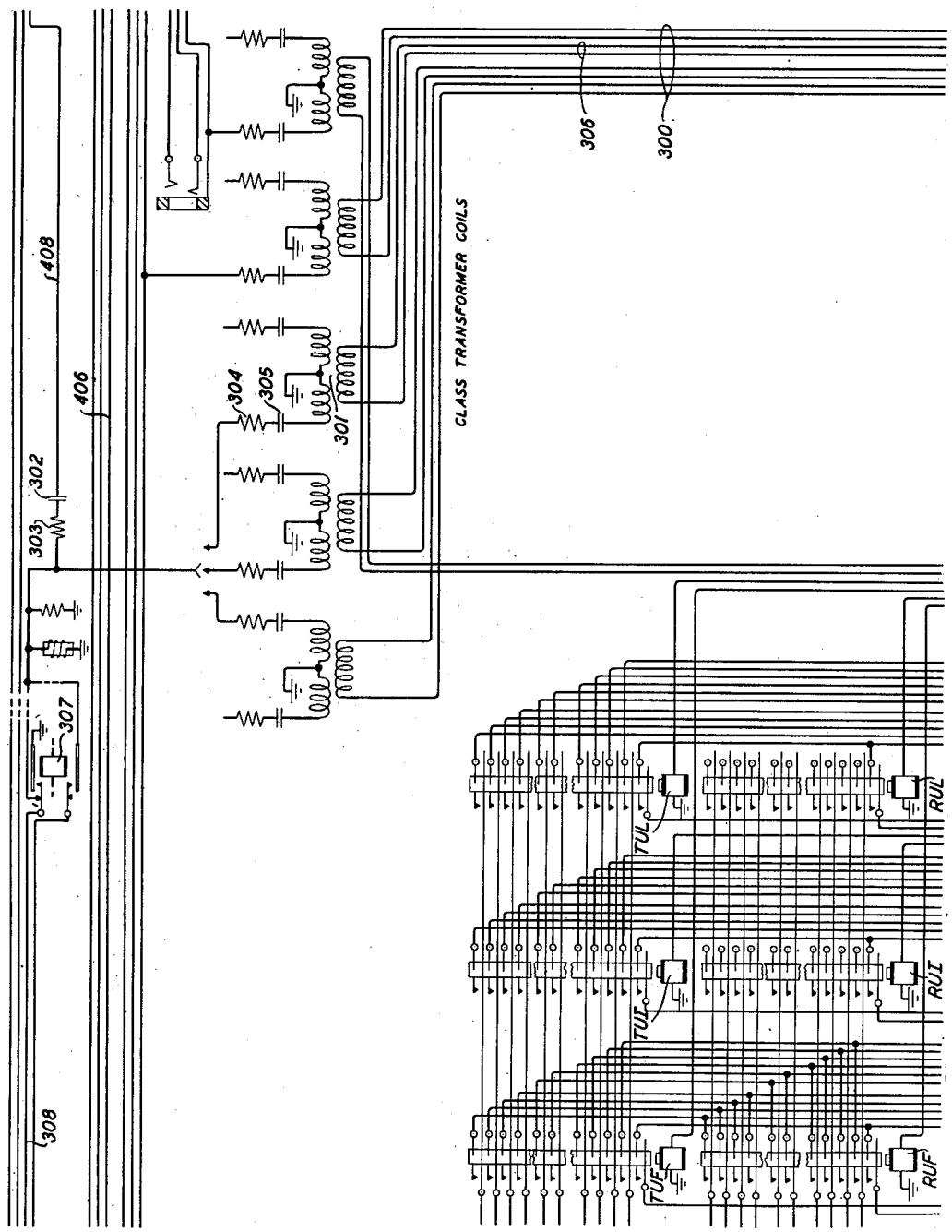
Figure 4:
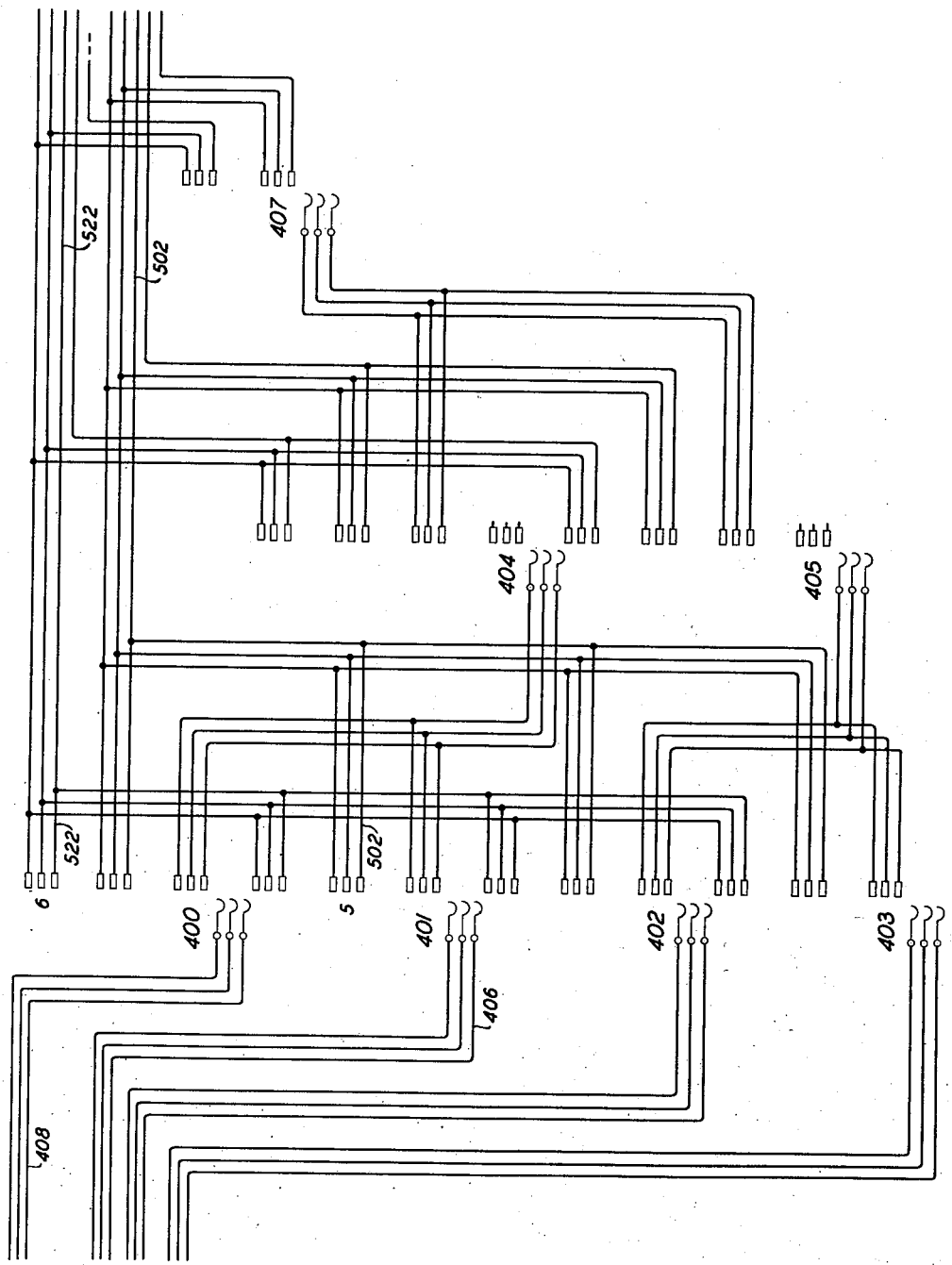
Figure 5:
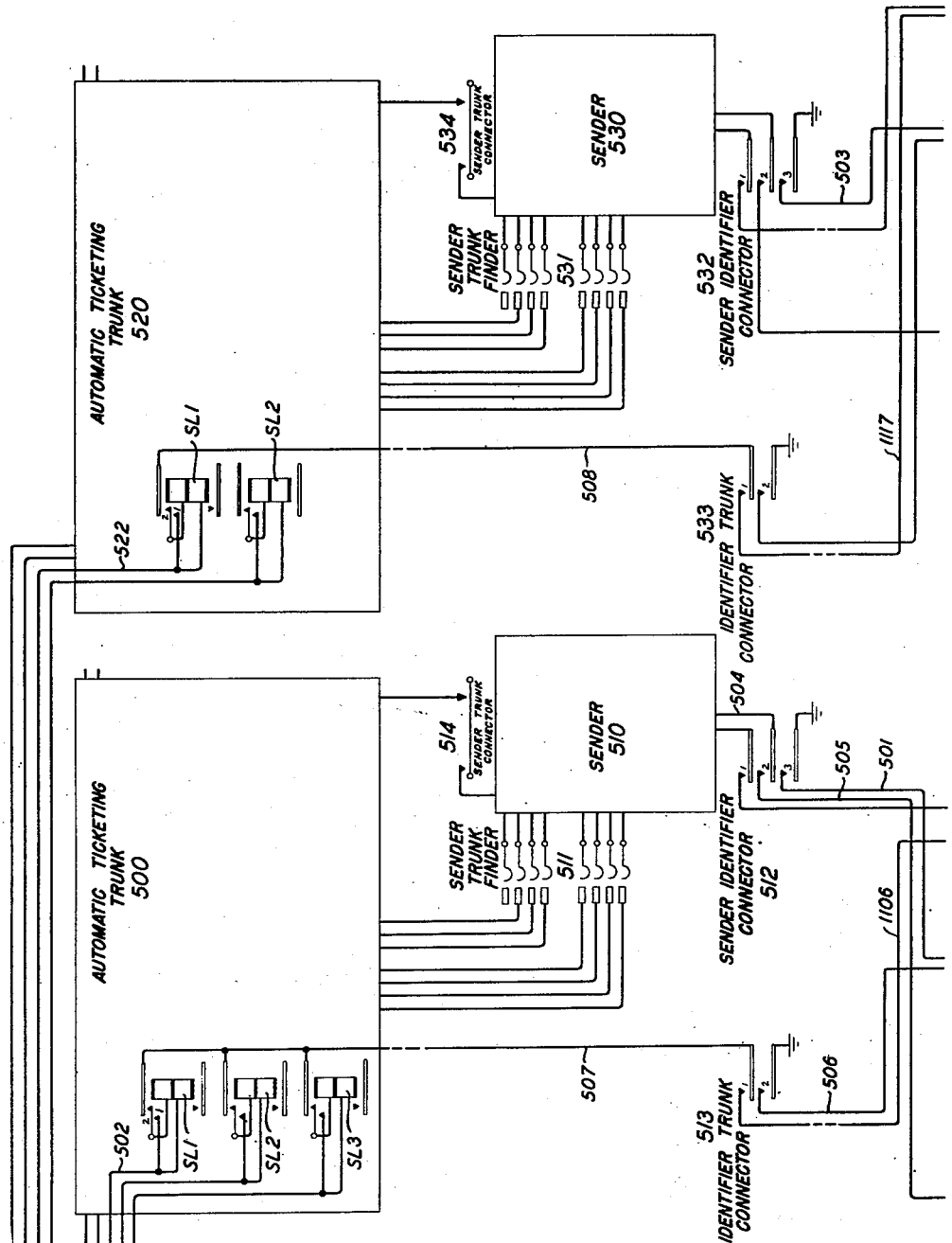
Figure 6:
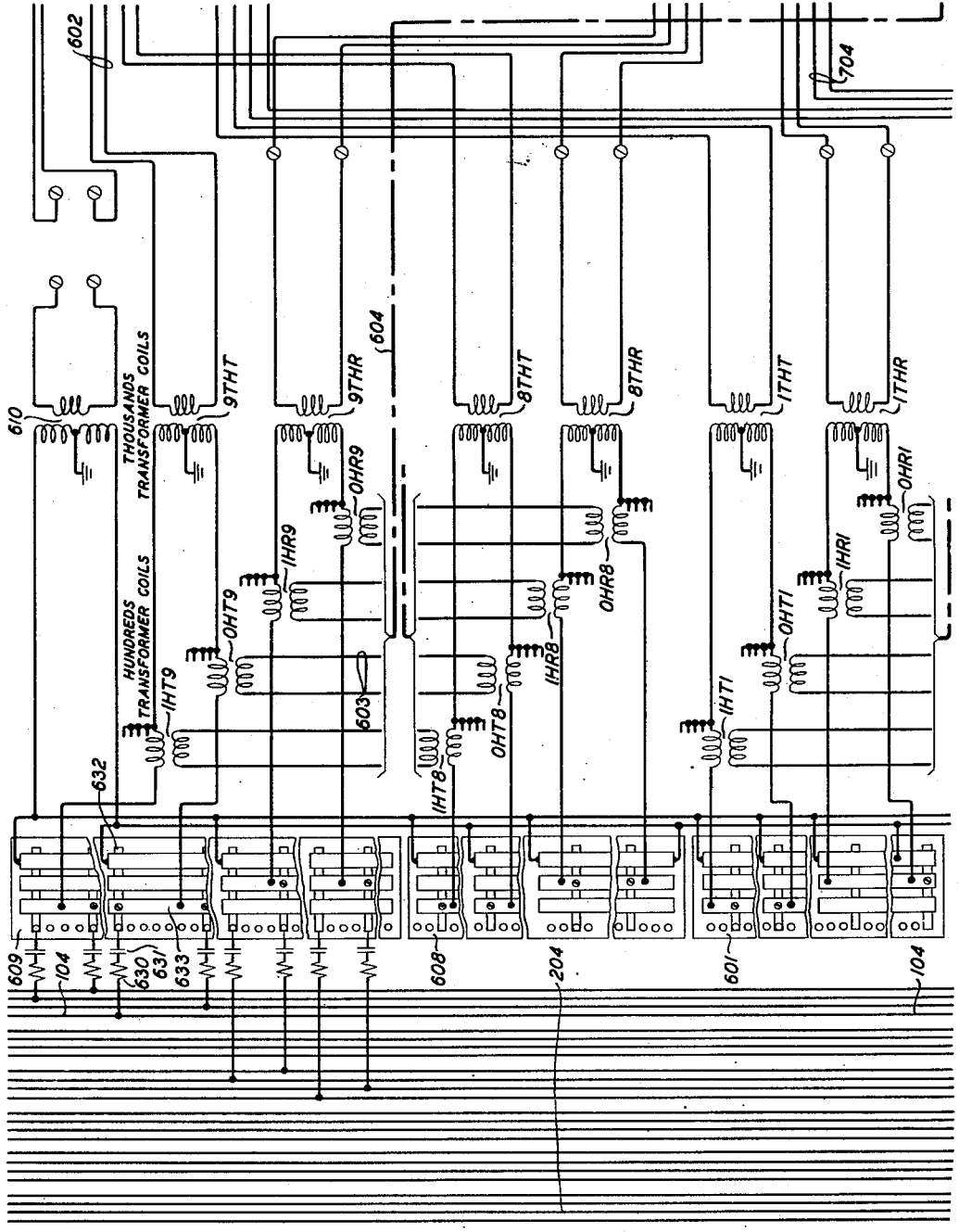
Figure 7:
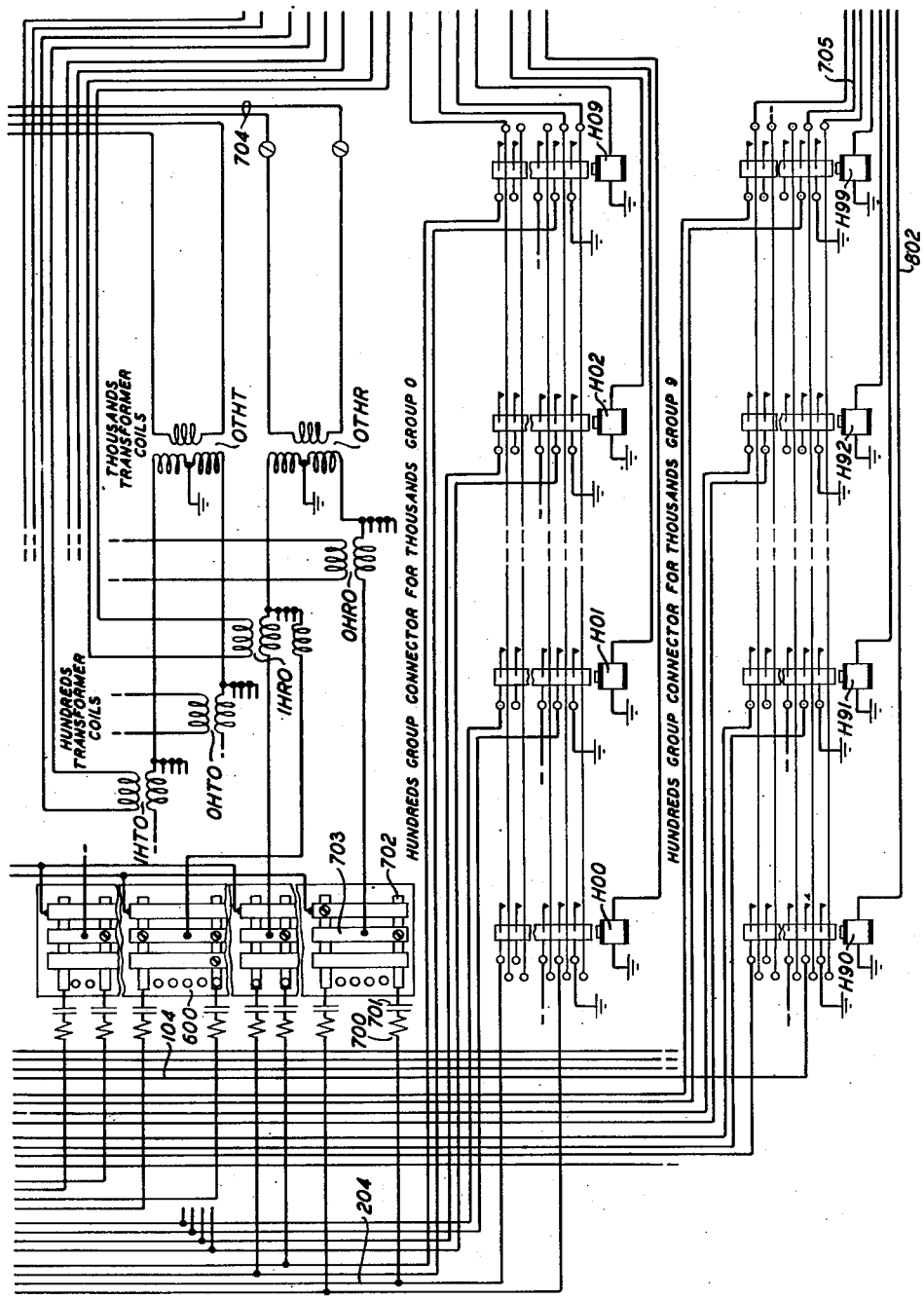
Figure 8:
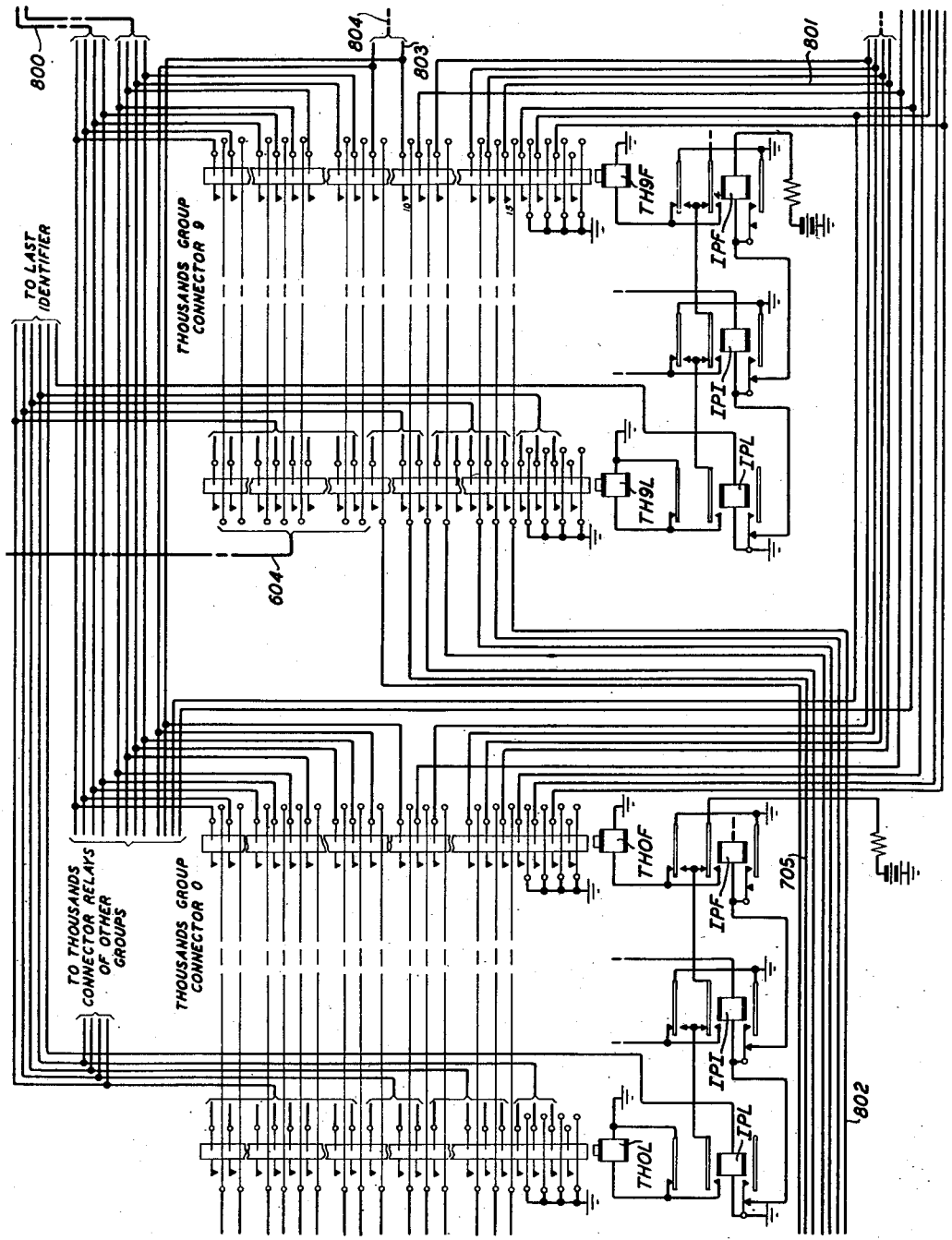
Figure 9:
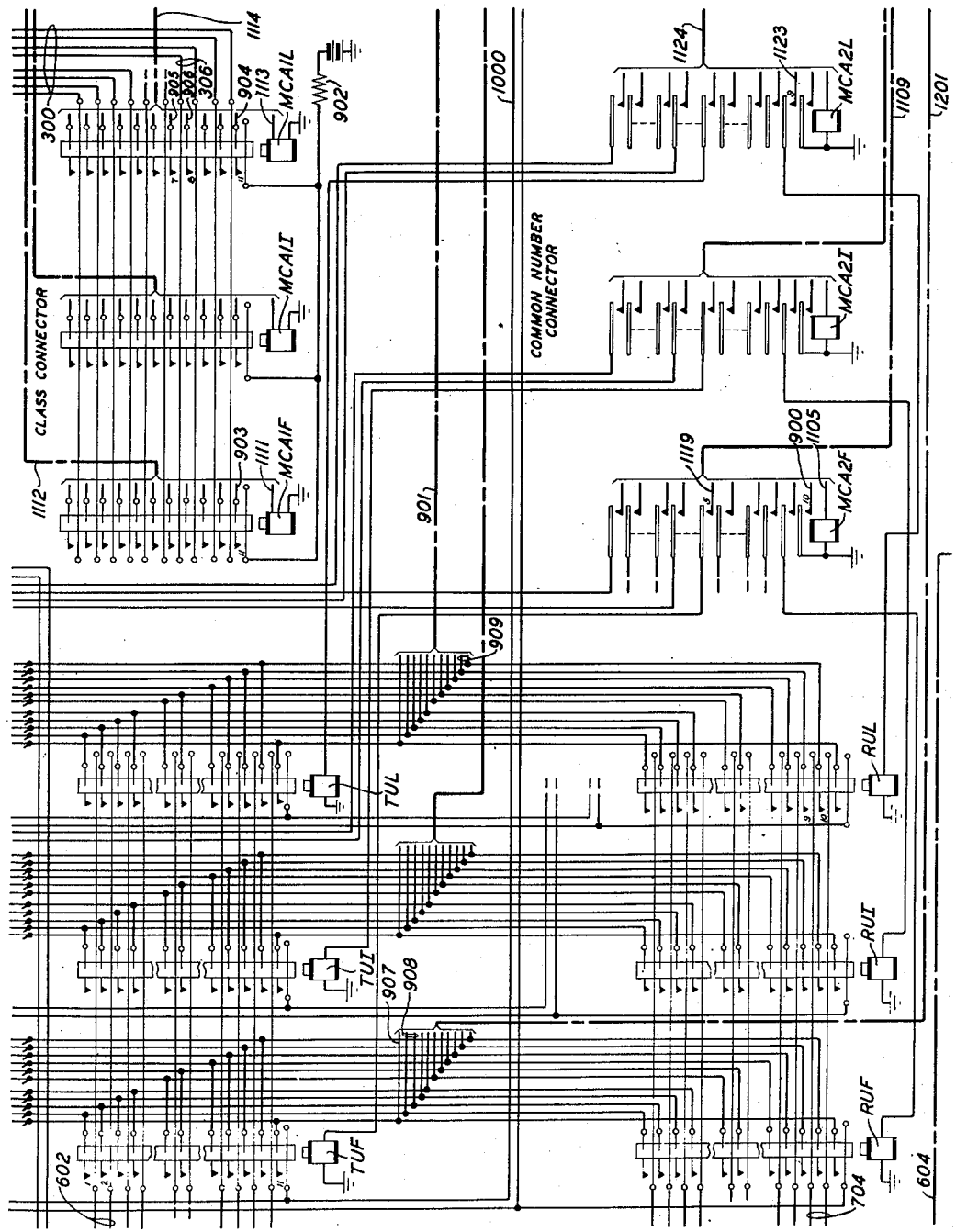
Figure 10:
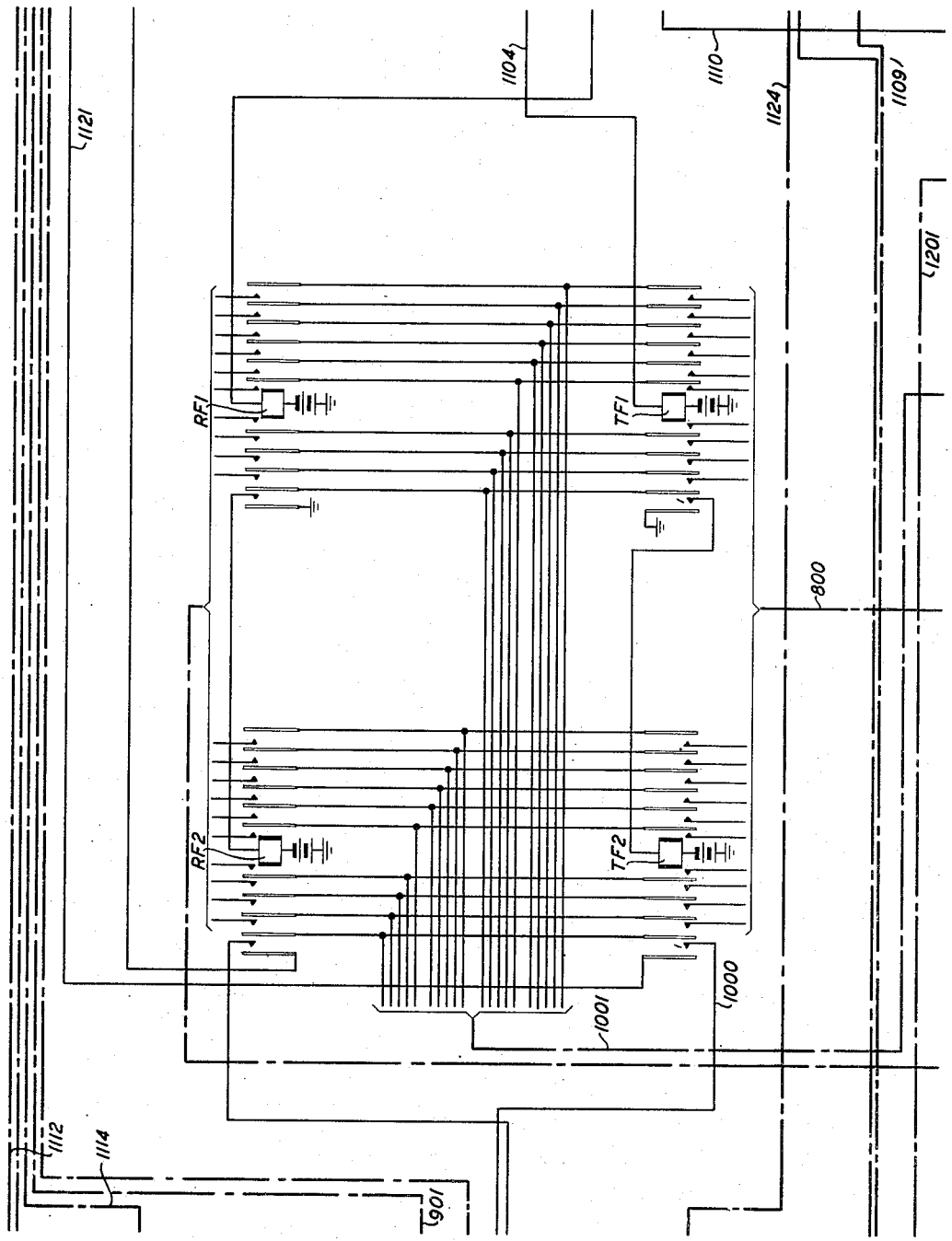
Figure 11:
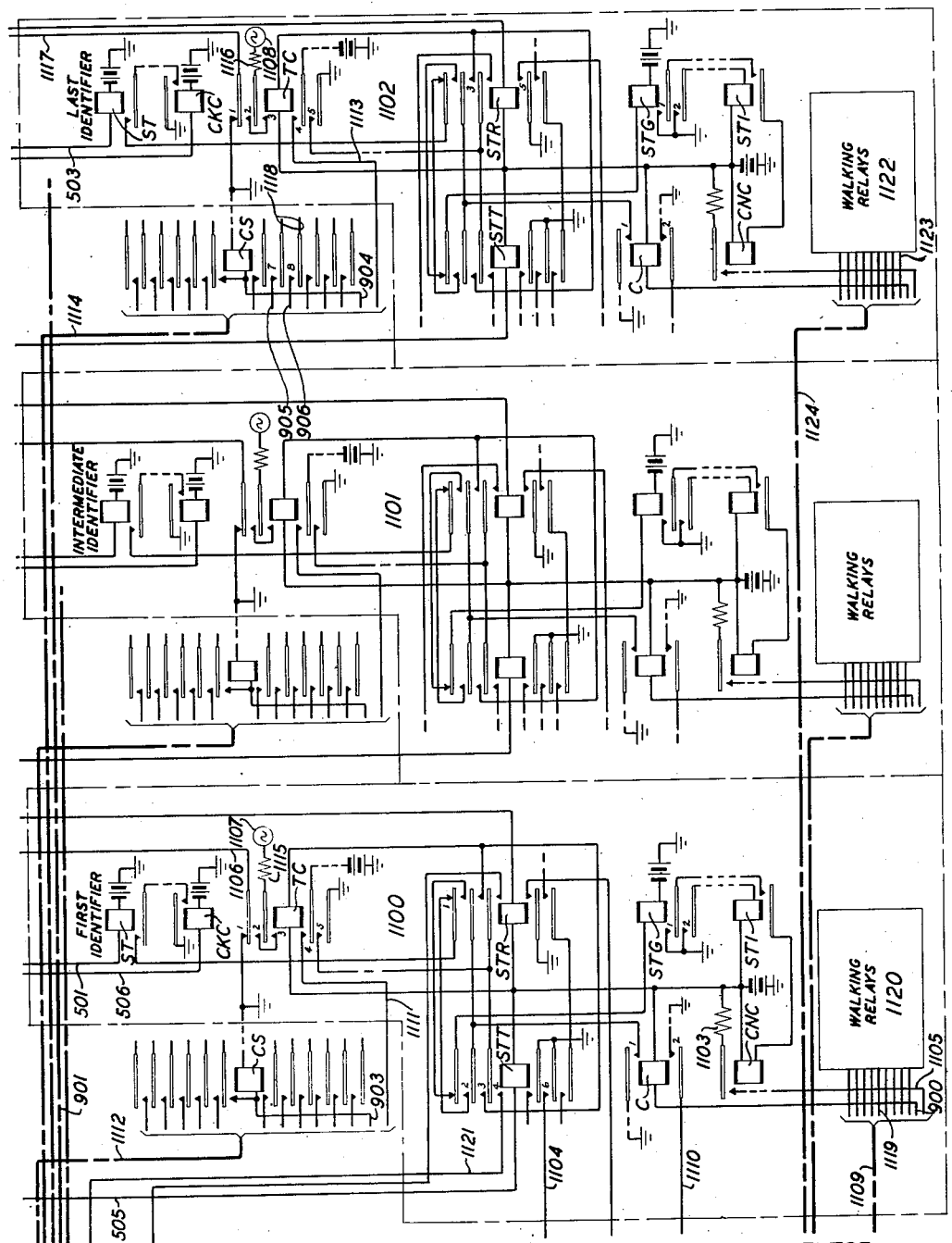
Figure 12:
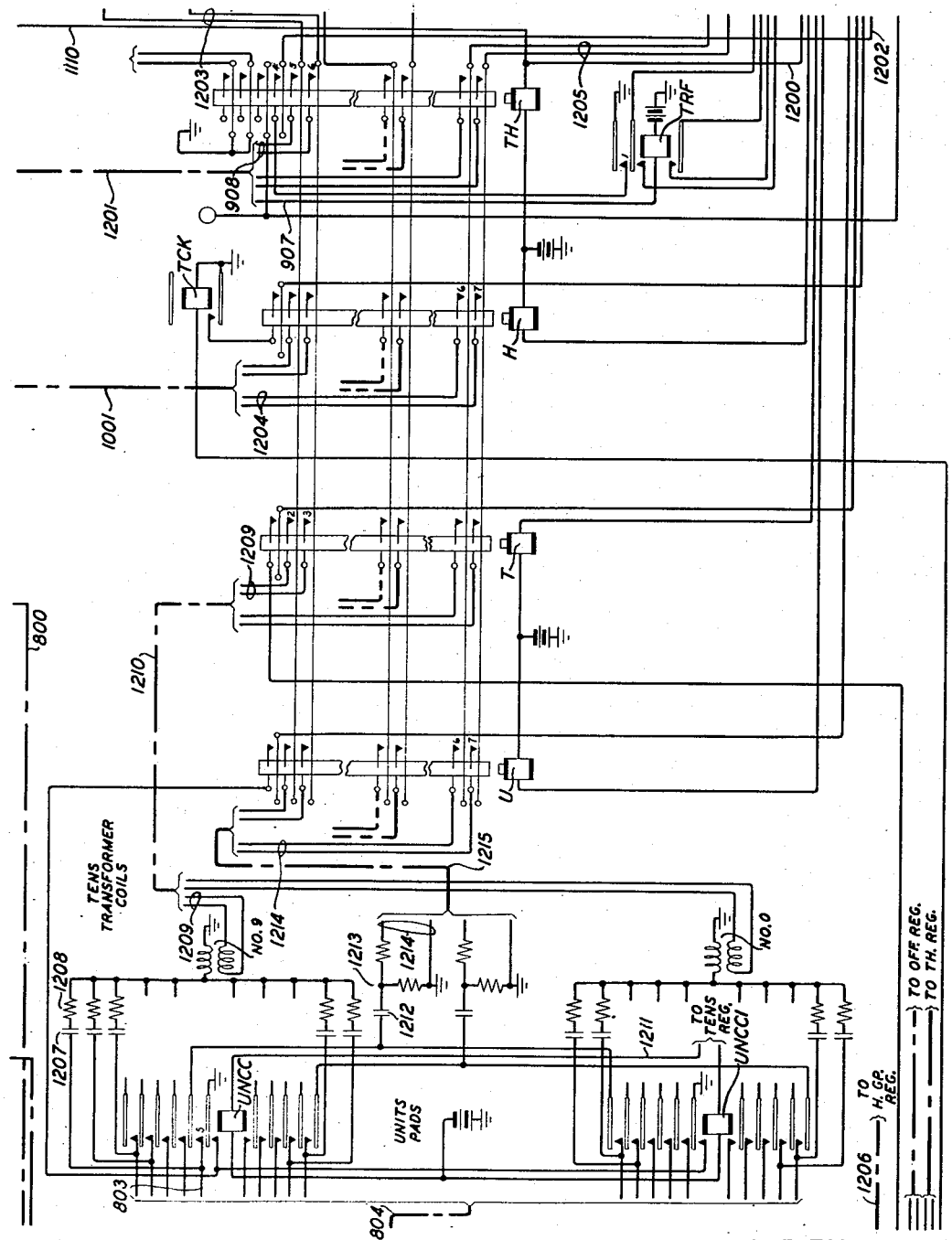
Figure 13:
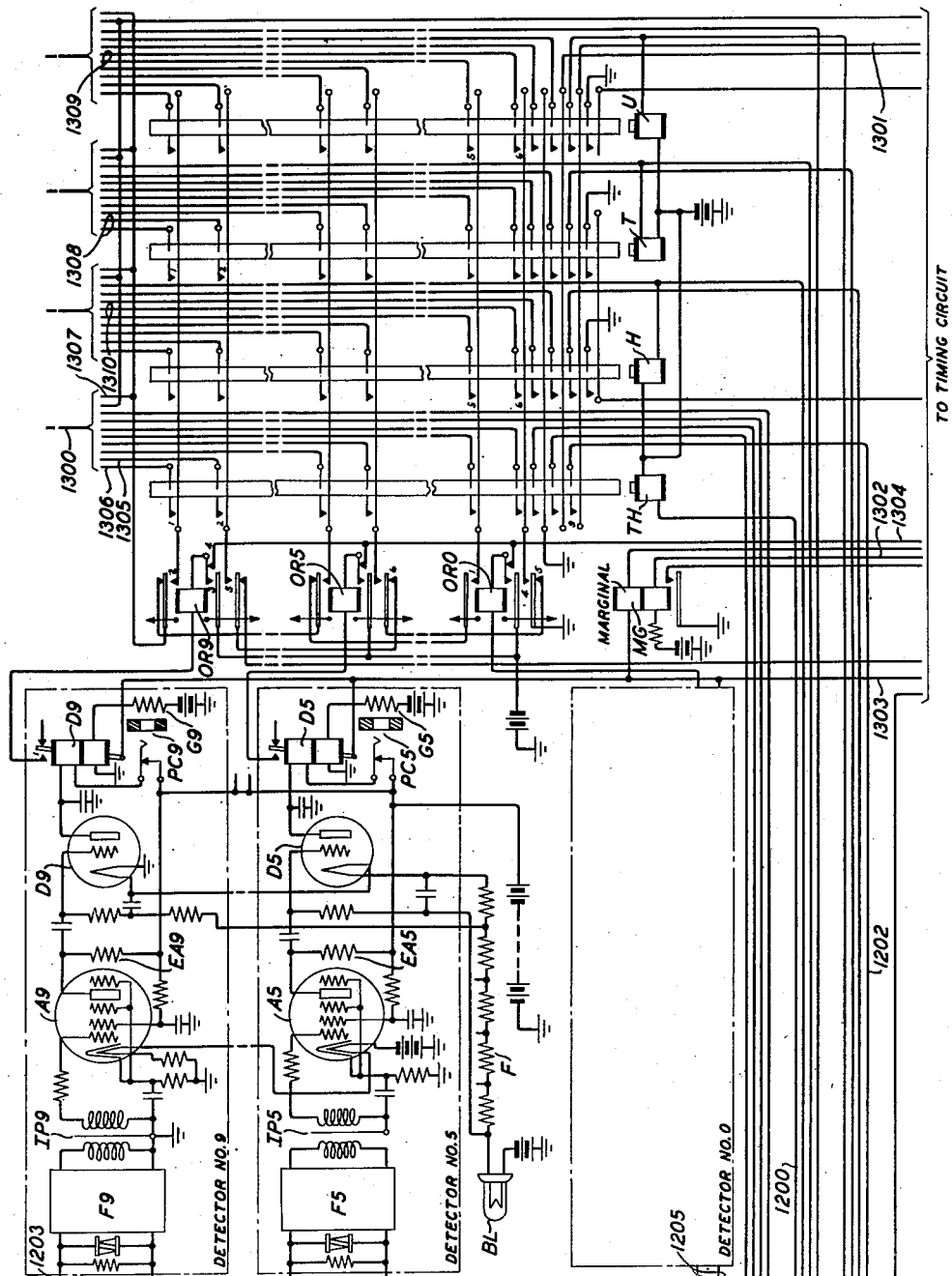

Fig. 3 in the upper portion thereof discloses three line finder-first selector links of different service classes extending between line finders of the first office unit of Figs. 1 and 2 and the first selector switches of Fig. 4 and discloses an operator's trunk circuit terminating in a first selector switch of Fig. 4 and in the lower and middle portions thereof shows respectively connecting relays and class transformer coils of the class and number circuit;

Fig. 4 shows schematically trains of first, second, and third selector switches over which connections may be extended from the lines of the office units of Figs. 1 and 2 to ticketing trunks of Fig. 5, branches of the incoming ends of which ticketing trunks terminating in the banks of all three of said selectors;

Fig. 5 in the upper portion thereof shows schematically two automatic ticketing trunks and in the middle thereof shows two senders and various connectors and trunk finders, wherein the trunks, senders, connectors, and trunk finders may be of the type fully disclosed by Gooderham;

Figs. 6, 7 and 8 show thousands number circuits which may be individual to the office unit shown in the left portions of Figs. 1 and 2 and common to the plurality of identifiers serving the office building in which the office units of Figs. 1 and 2 are located, Fig. 6 and the upper portion of Fig. 7 showing four of the ten thousands transformer coils and the associated hundreds transformer coils, Fig. 7 showing in the lower portion thereof two groups of hundreds connector relays having access to corresponding hundreds groups of lines of two of the thousands groups, and Fig. 8 showing two of the ten groups of thousands connector relays;

Figs. 9 and 10 together with the lower portion of Fig. 3, show the class and number circuit which is common to all identifiers serving the same office building, Figs. 3 and 9 showing in the left portions thereof switching relays whereby the class and number circuit has access to the thousands transformer coils of all of the thousands number circuits of the building, Fig. 9 showing in the upper right portion thereof the class connector relays allocated to the identifiers which have access to the class circuit and showing in the lower right portion thereof the number connector relays allocated to the identifiers which have access to the line identification circuits of the several office units of the same office building, and Fig. 10 showing in the right portion thereof office unit relays;

Fig. 11 shows, in skeleton form, three identifiers which may be of the type fully disclosed by Gooderham;

Figs. 12 and 13 show additional details of the first identifier shown in the left portion of Fig. 11, Fig. 12 showing two of the tens transformer coils for identifying the tens groups and tens digits of calling lines, units identifying pads, and switching relays for successively rendering different portions of the circuits of Figs. 6, 7 and 12 effective and Fig. 13 showing in the right portion thereof other switching relays and in the left portion thereof detector circuits connectable to the several portions of the identification circuit through the operation of the switching relays of Fig. 12 for detecting the presence of signal current on the connected sleeve conductor of any calling line and register relays associable with the detector circuits; and, Fig. 14 is a chart showing how the several figures of the drawings should be arranged to disclose the invention.

In this specification, circuit elements will be identified by designations which, in general, are abbreviations of words indicative of their functions followed by a number in parenthesis representing the figure of the drawing upon which that element appears. For example, coil 0HT0(7) refers to the transformer coil of the zero hundreds group in the tip field belonging to the zero thousands group, found in Fig. 7.

The line finders schematically illustrated in Figs. 1 and 2 are of the well-known step-by-step type, each having two brush sets, of which one has access to an upper bank of terminals in which one hundred lines terminate and of which the other has access to a lower bank of terminals in which a second one hundred lines terminate. Each group of two hundred lines is accessible from a subgroup of line finders, an idle one of which is started upon the initiation of a call from any line of the group. The line finders shown in the left portions of Figs. 1 and 2 serve lines of one office unit which may comprise ten thousand lines and the line finders shown in the right portion of these figures serve lines of a second office unit, both units being located in the same office building.

Each flat rate subscriber's line is provided with separate appearances in the banks of connector switches of different hundreds groups for the two-party stations of the line and, therefore, each flat rate party line subscriber has a distinguishing directory number. The line sleeve conductors of all lines have branches which are connected through serially-connected condensers and resistances to terminals on the cross-connecting rack and other branches which appear in the contacts of hundreds group connector relays. The sleeve conductor branches of the lines in office unit A terminate in the horizontal terminal strips of ten cross-connecting racks of which the racks 600, 601, 608, and 609 for the Nos. 0, 1, 8 and 9 thousands group of connector sleeve conductors are disclosed in Figs. 6 and 7. Each such terminal may be cross-connected over the vertical strips of the racks to the primary winding of the denied service transformer coil 610, if it represents a subscriber to which automatic ticketing service is to be denied, or through the primary winding of the hundreds group transformer coil of the hundreds connector group in which the appertaining subscriber's line terminates to the primary winding of the thousands group transformer coil of the thousands group in which the appertaining line terminates of a tip field of hundreds transformer coils such, for example, as coils IHT0(7)—0HT0(7), IHT1(6)—0HT1(6), IHT8(6)—0HT8(6), and IHT9(6)—0HT9(6) and of a tip field of thousands transformer coils such, for example, as coils 0THT(7), ITHT(6) to 8THT(6), and 9THT(6) if the substation is a tip party substation of a two-party flat rate line, or through the primary winding of a hundreds group transformer coil of the hundreds connector group in which the appertaining subscriber's line terminates to the primary winding of a thousands group transformer coil of the thousands group in which the appertaining line terminates of a ring field of hundreds transformer coils such, for example, as coils IHR0(7)—0HR0(7), IHR1(6)—0HR1(6), IHR8(6)—0HR8(6), and IHR9(6)—0HR9(6) and of a ring field of thousands transformer coils such as 0THR(7), ITHR(6) to 8THR(6), and 9THR(6) if the substation is a ring party substation of a flat rate party line, an individual line, or either a tip or ring party substation of the message rate party line. The horizontal and vertical strips of the racks are insulated from each other by interposed sheets of insulation and any horizontal line terminal strip may be cross-connected to any one of the vertical strips by the insertion of a screw at their point of intersection.

One hundred hundreds group connector relays are provided for each group of ten thousands number circuits, the connector relays H00(7), H01(7), H02(7) and H09(7) of the Nos. 0, 1, 2, and 9 hundreds group of the No. 0 thousands group and the connector relays H90(7), H91(7), H92(7) and H99(7) of the Nos. 0, 1, 2 and 9 hundreds group of the No. 9 thousands group being disclosed in Fig. 7.

The branches of the sleeve conductors of the lines terminating in office unit B are connected to cross-connecting racks and transformer coils and appear in hundreds connector relays which are similar to those disclosed in Figs. 6 and 7 and which are represented by the box in Fig. 2.

Ten groups of thousands connector relays are provided for each group of ten thousands number circuits, each group having a relay individualized to each of the identifiers serving the office building in which the office unit is located. In Fig. 8 relays TH0F(8)—TH0L(8) are the connector relays of the No. 0 thousands group of which relay TH0F(8) appertains to the first of the group of identifiers and relay TH0L(8) appertains to the last of the group of identifiers and relays TH9F(8)—TH9L(8) are the connector relays of the No. 9 thousands group. Ten similar groups of thousands connector relays are included within the box of Fig. 2 for the office unit B.

Each line finder is paired with a first selector switch, such first selector switches and a first selector switch in which an operator's trunk terminates being disclosed schematically by the wiper sets 400 to 403, inclusive, of Fig. 4. For further extending connections from calling lines, second selector switches disclosed schematically by wiper sets 404 and 405 and third selector switches such as disclosed schematically by wiper set 407 of Fig. 4 are provided. These selector switches may be of the well-known step-by-step type controlled directly by a calling subscriber's dial to establish local connections or a connection to an idle ticketing trunk such as disclosed schematically in Fig. 5 should the subscriber desire a connection to a subscriber's line which terminates in the toll area adjacent to the exchange area in which the calling line terminates. As disclosed, the ticketing trunks shown in Fig. 5 have branches which terminate in banks of first selector switches such as 400, other branches which terminate in banks of second selectors such as 404, and other branches which terminate in the banks of third selector switches such as 407, whereby a trunk may be seized respectively in response to the dialing of the first office code digit of certain distant offices, in response to the dialing of the first and second office code digits of other offices, and in response to the dialing of the three office code digits of still other offices.

In order to set forth clearly the novel features of the present invention a detailed description follows which will describe the identification aspects of such a system as disclosed by Gooderham modified in accordance with the present invention. Since the invention relates to the identification aspects of the system any of the line-trunk, trunk sender, sender-identifier, sender-trunk, and identifier-trunk switching apparatus and circuits have been skeletonized since they have no direct bearing upon the present invention and are fully disclosed by Gooderham.

GENERAL

The improvement over the system of the Gooderham disclosure above referred to, which improvement comprises the basis of the present invention, provides circuit means whereby any number of identifier circuits may connect with and use concurrently the class and common number circuits. The remainder of the present disclosure is a skeletonized showing of only such parts of the Gooderham disclosure as are necessary for a full understanding of the present invention. No attempt is made herein to duplicate the details of the Gooderham disclosure to which reference is made for details omitted herein for purposes of brevity and conciseness.

In the subsequent detailed description, the pertinent steps involved in a call from a tip party of a flat rate line will be described and then it will be mentioned, from time to time, how the simultaneous call from a ring party of a message rate line may be handled according to the present invention.

DETAILED DESCRIPTION

*Call by tip party of flat rate line*

SELECTION OF AND CONNECTION TO TICKETING TRUNK

It will be assumed that the tip party subscriber whose substation is identified by the numeral 100 in Fig. 1 initiates a call for a toll connection to a subscriber's line terminating in an office of a toll area to which the calling subscriber is permitted access by dialing. Upon the removal of the receiver from the switchhook, an idle line finder having access to the calling line, such as line finder 101, is started in search of the calling line in a well-known manner. When the line finder has found the calling line, the usual dial tone is transmitted over the calling line loop to inform the subscriber that his line has been connected with a first selector 401 paired with the line finder 101 and that he may therefore commence dialing the digits of the wanted line number.

It is assumed that the called number is such that a ticketing trunk over which such a connection may be effected may be reached from the fifth level of the bank of the first selector 401. In response to the dialing of the first office code letter, which has a digit value of five in the assumed case, the first selector 401 is operated to elevate its brush set to a position opposite the fifth bank level and then to hunt over the terminals of this level in search of an idle ticketing trunk. It will be assumed that the trunk 500, skeletonized in Fig. 5, is idle and that therefore the selector 401 seizes such trunk. A circuit is thereupon effective from the usual ground (not shown) at the selector 401 over the sleeve conductor 502 of the trunk 500 and through the lower winding of sleeve relay SL1(5) to battery (not shown). (The designation SL1(5) designates the relay marked SL1 on Fig. 5. This system of reference numerals will be carried through the specification as a general system of reference nomenclature.) Relay SL1(5) thereupon operates and locks to the grounded sleeve conductor 502 through its upper No. 1 contacts and upper winding to battery (not shown).

DIALING CALLED NUMBER

Since the first office code digit of the called number has been expended in directing the first selector 401, the second office code digit will be registered in the trunk circuit 500. The connection between the trunk 500 and the sender 510 will not be accomplished soon enough to "catch" the second office code digit but will be soon enough to register the third code digit. Subsequently, as fully explained in the Gooderham disclosure, when an identifier circuit is seized by send 510, the identifier will decode the expended code digits and transmit same to the sender 510 such that the latter will have registered therein sufficient of the called digits to effect the desired switching functions required for completing the connection to the called substation. Since such matters as the foregoing concerning the dialing, registration, and decoding of the called number do not enter into the the peculiarities of the present invention and since such matters are fully described by Gooderham, they will not be treated in detail in this description.

SELECTION AND SEIZURE OF A SENDER

As soon the the connection is cut through at the selector 401, a circuit is established for starting the trunk finder 511 hunting for the marked calling trunk 500. Another circuit (not shown) is completed for applying ground over the No. 2 contacts of sleeve relay SL1(5) and through the upper winding thereof to hold sleeve relay SL1(5) operated and over the sleeve conductor 502 of the trunk 500 to hold the selector 401.

The trunk finder 511 makes interconnection between the trunk 500 and the sender 510, extending therebetween various control conductors, the purposes and functions of which are fully set for in the Gooderham disclosure and do not form any novel part per se of the present invention as distinguished from Gooderham.

PARTY IDENTIFICATION TEST

When sender 510 was cut through to the calling trunk 500 by the completion of the interconnection functions of the trunk finder 511, a test followed whereby the sender 510 tests for a grounded tip conductor. If the sender 510 finds a grounded tip conductor, as it will in the assumed case of a tip party 100 initiating the call, the sender 590 registers the identification of the calling party as a tip party. If there is no grounded tip conductor, the sender 500 assumes that the calling party is a ring party, or, at least, assumes that the directory number of the calling party is to be obtained from a ring field of hundreds and thousands coils, which were previously described with reference to Figs. 6 and 7. In other words, the sender identifies the calling party, for present purposes at least, as to which field (tip or ring) of transformer coils to bring into operation in connection with an identifier subsequently seized for identifying the calling party's directory number.

SEIZURE OF AN IDENTIFIER

When the first digit, which may have been the last office code digit or the thousands digit, etc., has been received in the sender 510, circuits (not shown) effect the operation of a sender-identifier connector 512 for extending control conductors from the seized sender 510 to an idle identifier, such as the first identifier 1100 shown skeletonized in Figs. 10, 11, 12 and 13. Such an identifier is fully disclosed by Gooderham and only those parts thereof are shown here which are necessary for a complete understanding of the present invention.

The operation of sender-identifier connector 512 completes an operating circuit for the start relay ST(11) of identifier 1100 from ground, over contact 3 of sender-identifier connector 512, conductor 501, to battery through the winding of start relay ST(11) of identifier 1100. Relay ST(11) of identifier 1100 operates to start the functioning of the identifier.

*Call by ring party of message rate line*

It is convenient at this point in the description to return to an assumed initiation of a second simultaneous call from, for instance, ring party 200 of office A, shown in Fig. 2.

By a process similar to the above-described circuit operations controlled by the tip party flat rate subscriber 100, a line finder 201 hunts for the calling ring party message rate subscriber 200; line finder 201 is paired with a first selector such as first selector 400; selector 400, in response to the first office code (assumed to have a digital value of six) steps to its sixth bank level and hunts therein for an idle ticketing trunk, which, it will be assumed, is trunk circuit 520 skeletonized in Fig. 5. Sleeve relay SL1(5) of trunk 520 is operated through its lower winding over sleeve conductor 522 and locks thereto through its upper winding and over its upper No. 1 contacts.

The remaining called number digits are dialed as above described in connection with the call from subscriber 100 over trunk 500.

Trunk finder 531 is started hunting from the marked calling trunk 520 and a circuit (not shown) is completed for applying ground over the No. 2 contacts of sleeve relay SL1(5) of trunk 520 and through the upper winding thereof to hold sleeve relay SL1(5) of trunk 520 operated and over the sleeve conductor 522 to hold selector 400.

The trunk finder 531 makes interconnection between the trunk 520 and an idle sender 530, extending therebetween various control conductors as above described for trunk finder 511 interconnecting trunk 500 and sender 510.

When sender 530 has cut through to the calling trunk 520 by means of the operation of trunk finder 531, with its attendant functions, the above-described party identification test is made. Since the calling subscriber 200 is assumed to be a ring party message rate subscriber the sender 530 will find an absence of ground on the tip conductor and will, therefore, assume that the directory number of such calling party is to be identified by means of a ring field of transformer coils. As a matter of fact, for two-party message rate lines, regardless of which party initiates a call, such calling subscriber will be identified in a ring field of coils.

When the first digit has been registered in sender 530, circuits (not shown) operate a sender-identifier connector 532 for extending control conductors from the seized sender 530 to a second idle identifier, such as the last identifier 1102 shown skeletonized in Fig. 11. Such identifier will be identical, except as explained hereinafter, with the others, such as the aforementioned first identifier 1100.

The operation of sender-identifier connector 532 completes an operating circuit for start relay ST(11) of identifier 1102 from ground, over contact 3 of sender-identifier connector 532, conductor 503, to battery through the winding of start relay ST(11) of identifier 1102. Relay ST(11) of identifier 1102 operates to start the functioning of the identifier.

IDENTIFIER OPERATIONS

Upon the operation of sender-identifier connector 512, start relay ST(11) of identifier 1100 was operated as previously described. A circuit was also established for operating the tip party relay STT(11) of identifier 1100. As a result of the party test made by sender 510 it was found that the calling subscriber 100 was a tip party, i. e., one to be identified by means of a tip field of transformer coils, and consequently, upon the operation of sender-identifier connector 512, the operating circuit for tip party relay STT(11) was completed from ground in sender 510, over conductor 504, contact 2 of sender-identifier connector 512, conductor 505, to battery through the winding of tip party relay STT(11). Relay STT(11) operates and completes a circuit for operating tip field relay TF1(10) in a circuit extending from ground, over contact 6 of tip party relay STT(11), conductor 1104, to battery through the winding of tip field relay TF1(10). Relay TF1(10) operates and, in an obvious circuit from ground over its contact 1, operates tip field relay TF2(10). Tip field relays TF1(10) and TF2(10), upon operating, as will be described hereinafter, prepare circuits to connect tip coils of a thousands number circuit to detector circuits in the identifier 1100.

In the meantime, identifier 1102 has been operating similarly with the operation of ring party relay STR(11) of identifier 1102 as a result of sender 530 having determined, as a result of a party test, that subscriber 200 is to be identified in a ring field of coils. The operation of ring party relay STR(11) in identifier 1102 will operate relays in identifier 1102 corresponding to ring field relays RF1(10) and RF2(10) of identifier 1100 to prepare circuits for connecting ring coils of a thousands number circuit to detector circuits in the identifier 1102.

OPERATION OF IDENTIFIER-TRUNK CONNECTOR

Upon its seizure, identifier 1100 is informed of the location of trunk 500 and, upon the operation of start relay ST(11) of identifier 1100, circuits (not shown) are completed for operating an identifier-trunk connector 513, which extends a number of control conductors from the calling trunk 500 to the seized identifier 1100. A similar interconnection is effected between trunk 520 and identifier 1102 via identifier-trunk connector 533. Identifier-trunk connector 513, upon operating, completes the operating circuit of check relay CKC(11) of identifier 1100 in a circuit extending from ground, over contact 2 of identifier-trunk connector 513, conductor 506, to battery through the winding of check relay CKC(11), which relay thereupon operates to indicate that the identifier-trunk connector 513 has operated. A similar circuit operates check relay CKC(11) of identifier 1102. Upon the operation of identifier-trunk connector 513, an additional holding ground is provided for the sleeve of the trunk 500 in a circuit extending from ground, over contact 1 of relay TC(11) of identifier 1100, conductor 1106, contact 1 of identifier-trunk connector 513, conductor 507, and contacts 2 and 1 of sleeve relay SL1(5) of trunk 500, to the sleeve conductor 502. A similar holding circuit is likewise provided from identifier 1102 to the sleeve conductor 522 of trunk 520.

RECONSTRUCTING DIALED OFFICE CODE AND TRANSMITTING SAME TO SENDER

As fully described in the Gooderham disclosure, the identifiers, such as 1100 and 1102, utilize the fact that particular sleeve relays, such as SL1(5) of trunk 500 and SL1(5) of trunk 520, have been operated to reconstruct the office code digits expended prior to the registration of any digits.

The identifier, such as 1100, transmits the office code to the sender, such as 510, so that the latter will have sufficient information with which to extend the connection.

Both of these functions of reconstructing the office code and transmitting same to a sender, in addition to the sender function of extending the connection in accordance therewith, are not novel parts per se of the present invention and reference is made to Gooderham for details thereof.

Calling line identification

GENERAL

In the Gooderham disclosure each identifier contains a signal source of 270 cycles. Identification, in general, was effected by passing a 270-cycle signal back over the sleeve of the extended connection to the calling line, through transformer coils, and through filters and amplifiers in order to detect and register certain identification information concerning the calling line, such as thousands, hundreds, tens, and units of the directory number and the class of service of the calling line.

In the present invention, each identifier is characterized by a particular frequency ranging from below 200 cycles to above 400 cycles. The frequencies characterizing particular identifiers are conveniently separated by say 30 cycles from each other. The detectors of a particular identifier contain filters which, for all practical purposes, will pass only the frequency of the associated identifier.

DETECTORS

In Fig. 13 are shown three detectors, such as Detector No. 9 and Detector No. 5 in detail, and Detector No. 0 as a block. These detectors are the same in all respects as those disclosed in detail by Gooderham except that the filters, such as F9(13) and F5(13) are arranged to pass only that particular signal frequency characterizing the associated identifier. For instance, as will be described later, identifier 1100 contains a signal source 1107 of say 225 cycles; whereas, identifier 1102 contains a signal source 1108 of say 345 cycles. The detectors of identifier 1100, shown partly in Fig. 13, contain filters, such as F9(11) and F5(11), which will pass only the frequency 225 cycles and will not permit the associated detectors to respond to the signal frequencies of other identifiers, such as identifier 1102 which is similarly arranged to exclude from its detectors all signal frequencies other than its own, 345 cycles.

Each detector, such as Detector No. 9 of identifier 1100, comprises an input filter F9(13), an input transformer IP9(13), amplifier tube A9(13), detector tube D9(13), and a detector relay D9(13), which is normally as shown and which operates its armature to the left in response to receipt by Detector No. 9 of the correct signal frequency of 225 cycles.

COMMON NUMBER AND CLASS CIRCUIT

The initial identification function of an identifier, such as identifier 1100, is to determine the class of service to which the calling subscriber is entitled and to determine the thousands group (thousands digit of the calling line directory numericals) within which the calling subscriber is allocated.

Upon the operation of check relay CKC(11), start relay ST(11), and tip party relay STT(11), all of identifier 1100, a circuit is completed for operating start relay STG(11). Such circuit extends from ground, over the contacts of check relay CKC(11), contacts of start relay ST(11), contact 1 of ring party relay STR(11), contact 2 of tip party relay STT(11), to battery through the winding of start relay STG(11). Relay STG(11) operates and completes an obvious circuit over its contact 2 for operating the thousands group start relay STI(11). Relay STI(11), upon operating, completes a circuit for operating relay CNC(11), extending from ground, over contact 1 of relay STG(11), contact of relay STI(11), to battery through the winding of relay CNC(11), which thereupon operates.

Relay CNC(11), upon operating, completes a circuit for operating a common number circuit connector MCA2F(9) for interconnecting the first identifier 1100 with the common number circuit comprising part of Fig. 9 and the lower part of Fig. 3. Such circuit may be traced from battery, through resistance 1103, over the contact of relay CNC(11) of identifier 1100, conductor 1105, through cable 1109, to ground through the winding of connector relay MCA2F(9). Connector relay MCA2F(9), upon operating, seizes the common number circuit and connects it to identifier 1100 and completes a circuit for operating relay C(11) of identifier 1100 extending from ground, over contact 10 of connector MCA2F(9), conductor 900, cable 1109, to battery through the winding of relay C(11). Relay C(11) thereupon operates.

By a similar process, relays STG(11), STI(11), and CNC(11), of identifier 1102, were operated to in turn operate connector relay MCA2L(9) associated with the last identifier 1102 and interconnecting the common number circuit with the last identifier 1102 concurrently with the first identifier 1100. Likewise, upon the operation of connector MCA2L(9), relay C(11) of identifier 1102 is operated.

Upon the operation of relay C(11) of identifier 1100, a circuit is completed, under the control of a timer (not shown), for operating the thousands switching relays TH(12) and TH(13) extending from ground, on contact 2 of relay C(11), conductor 1110, to battery through the winding of thousands switching relay TH(12), and in parallel over conductor 1200, to battery through the winding of thousands switching relay TH(13). Relay TH(12), upon operating, connects the input sides of the detectors of Fig. 13, over cable 1201 to the common number circuit. Relay TH(13), upon operating, connects the contacts of the register relays 0R0(13) to 0R9(13), associated with the output sides of the detectors, over conductors of cable 1300 to the windings of the thousands group register relays (not shown).

Likewise, the operation of relay C(11) of identifier 1102 makes similar interconnections from the common number circuit, over cable 901, into identifier 1102 where it terminates at a switching relay similar to relay TH(12), and from a switching relay similar to relay TH(13) to thousands group register relays in identifier 1102.

Upon the operation of relay C(11) of identifier 1100, above described, a circuit is completed for operating relay TC(11) of identifier 1100. Such circuit extends from ground, over contact 1 of relay C(11), contact 3 of tip party relay STT(11), to battery through the winding of relay TC(11), which relay thereupon operates. Relay TC(11) of identifier 1102 likewise operates; but, as has been assumed, since the calling subscriber which effected the seizure of identifier 1102 was assumed to have been a ring party, relay TC(11) of identifier 1102 will be operated under the control of contact 3 of relay STR(11) instead of relay STT(11).

CLASS IDENTIFICATION

When relay STI(11) of identifier 1100 operates at the start of the calling line identification, circuits (partly not shown) were established for operating class connector relay MCA1F(9) associated with the first identifier 1100. Such circuit extends from battery, over contact 4 of relay TC(11), conductor 1111, cable 1112, to ground through the winding of class connector relay MCA1F(9). Relay MCA1F(9), upon operating, completes a circuit for operating the class-of-service relay CS(11) associated with identifier 1100, said circuit extending from battery, through resistance 902, contact 11 of class connector MCA1F(9), conductor 903, cable 1112, to ground through the winding of class-of-service relay CS(11). Relay CS(11) operates, thereby extending the secondary windings of the class transformer coils of Fig. 3 over conductors 300, contacts of class connector relay MCA1F(9), cable 1112, contacts of class relay CS(11) to detector circuits like those of Fig. 13. Likewise, with regard to identifier 1102, the operation of relay TC(11), above described, operates class connector MCA1L(9), associated with the last identifier 1102, in a circuit extending from battery, over contact 4 of relay TC(11), conductor 1113, cable 1114, to ground through the winding of class connector relay MCA1L(9). Relay MCA1L(9), upon operating, operates class-of-service relay CS(11), associated with identifier 1102, in a circuit extending from battery, through resistance 902, contact 11 of relay MCA1L(9), conductor 904, cable 1114, to ground through the winding of class relay CS(11), associated with identifier 1102. Relay CS(11) associated with identifier 1102, upon operating, extends the secondary windings of the class transformer coils of Fig. 3, over conductors 300, contacts of class connector relay MCA1L(9), cable 1114, contacts of class relay CS(11), associated with identifier 1102, to detector circuits of identifier 1102.

Relay TC(11) of identifier 1100, upon operating, also completes a circuit for transmitting signal frequency, say 225 cycles, over the sleeve of the connection. Such circuit may be traced from the source 1107 of 225-cycle signal current, through resistance 1115, contacts 3 and 2 of relay TC(11), conductor 1106, contact 1 of identifier-trunk connector 513, conductor 507, contacts 2 and 1 of sleeve relay SL1(5) of trunk 500, sleeve conductor 502, lowermost terminal of bank 5 of first selector 401, lowermost brush of selector 401, to sleeve conductor 406 of the line finder-selector trunk. Likewise, relay TC(11) of identifier 1102, upon operating, completed a circuit from the source 1108 of signal current, say 435 cycles, through resistance 1116, contacts 3 and 2 of relay TC(11), conductor 1117, contact 1 of identifier trunk connector 533, conductor 508, contacts 2 and 1 of sleeve relay SL1(5) of trunk 520, sleeve conductor 522, lowermost terminal of bank 6 of first selector 400, lowermost brush of selector 400, to sleeve conductor 408 of the line finder-first selector trunk.

In the case of the tip party 100 of a two-party flat rate line, now associated with identifier 1100, no class identification is required; therefore, the sleeve conductor 406 of the associated line finder-selector trunk is not connected to any primary winding of the class transformer coils of Fig. 3 and no class indication will be registered in identifier 1100. In the case of the ring party 200 of a two-party message rate line, now associated with identifier 1102, class indication is required; therefore, the sleeve conductor 408 of the associated line finder-selector trunk will be connected to one of the primary windings of a class transformer of Fig. 3, say transformer 301. The 435-cycle tone will be transmitted over sleeve conductor 408, through condenser 302 and resistance 303, resistance 304 and condenser 305, to ground through the left portion of the primary winding of class transformer 301. Such signal will be transmitted by the secondary winding of transformer 301, over conductors 306, contacts 7 and 8 of class connector MCA1L (9), conductors 905 and 906, cable 1114, contacts 7 and 8 of class relay CS(11) of identifier 1102, conductors 1118, and through detectors which respond only to 435 cycles to operate the proper class register relay (not shown).

It is to be noted that both identifiers 1100 and 1102 are connected to the common class transformers at the same time. This means that both identifiers will receive all signal frequencies then being transmitted through such transformers. In the system of the Gooderham disclosure it was necessary to permit only one identifier at a time to connect with the secondaries of such transformers because each identifier was arranged to transmit, receive, and respond to the same signal frequency of say 270 cycles. It was thus necessary to preclude false responses in concurrently connected identifiers. This, of course, delayed the functioning of identifiers during ever increasing traffic conditions, thus creating somewhat of a "bottle-neck" in handling traffic. The present invention, as should now be apparent, has eliminated this disadvantage by permitting more than one identifier to have access concurrently to the class circuit. Such is possible by means of the individual signal frequencies per identifier and the mutually exclusive filter per identifier, as has been explained hereinbefore. As will be appreciated from subsequent description of the thousands group identification, the same means permits more than one identifier to have access simultaneously to the common number circuit.

The respective class connectors MCA1F(9) and MCA1L(9) may be released at any convenient time after registration in respective identifiers of class identifications, if any. Such release, when effective, will release the class relays CS(11) of associated identifiers. The time of such releases of class connectors is not important for, as above described, identifiers cannot interfere with each other by concurrent connections to such class circuit.

THOUSANDS GROUP IDENTIFICATION

In the meantime, while the class identification was progressing, both identifiers 1100 and 1102 were connecting to the common number circuit for the purpose of identifying the thousands group (thousands digits of the directory numericals) within which the respective calling subscribers 100 and 200 are further to be identified with respect to hundreds, tens, and units digits.

Relay TC(11) of identifier 1100, upon operating as above described, completes a circuit (partly not shown) under the control of so-called "walking relays," box 1120 of Fig. 11, from battery (not shown) over conductor 1119 from walking relays 1120, through cable 1109, contact 5 of common number connector relay MCA2F(9), to ground through the winding of tip field switching relay TUF(9) allocated to ten thousands number circuits which may or may not be in the same office unit. The operation of switching relay TUF(9) connects the secondary windings of the ten thousands transformer coils of the tip field (in Figs. 6 and 7) over the contacts of relay TUF(9) to cable 1201, to the contacts of thousands switching relay TH(12) of identifier 1100.

When relay TUF(9) of the common number circuit operated, a circuit was established from ground, over contact 5 of relay TC(11) of identifier 1100, contact 4 of tip party relay STT(11), conductor 1121, contact 1 of tip field relay TF2(10), conductor 1000, contact 11 of tip field switching relay TUF(9), conductor 907, cable 1201, to battery through the winding of relay TRF(12), operating relay TRF(12). Relay TRF(12), upon operating, establishes a start signal to the detector timing circuit (not shown) indicated by a labeled bracket in Fig. 13. Such start signal may be traced from ground, over contact 1 of relay TRF(12), contact 4 of thousands switching relay TH(12), conductor 1202, contact 9 of thousands switching relay TH(13), and over conductor 1301 to the detector timing circuit to operate a start relay (not shown) therein. The start relay (not shown), upon operating, completes a circuit through the lower winding of the marginal relay MG(13) by placing ground on conductor 1302 from the timing circuit. Relay MG(13), being marginal, does not operate at this time. Ground from the timing circuit is supplied over conductor 1303 to the armatures of all anode relays, such as relays D9(13) and D5(13), to prepare an operating circuit for one of the register relays OR0(13), OR5(13), OR9(13), etc. In addition, a timing interval is started. The detailed description of the functioning of the timing circuit (not shown) may be obtained from the aforementioned Gooderham disclosure.

The 225-cycle tone, transmitted over the sleeve conductor 406 of the line finder-selector trunk from the associated identifier 1100, may be traced further over the sleeve brush 102 of line finder 101, sleeve conductor 103 of the calling line, conductor 104, through resistance 630 and condenser 631, to a horizontal cross-connecting strip 632 on the cross-connecting rack 609. It will be assumed that the thousands digit of the calling line (subscriber 100) directory numericals is 9 and the hundreds digit is 0 and that the strip 632 is therefore cross-connected to the vertical strip 633 as by a screw inserted through holes at their intersection. The signaling current will therefore flow through the primary winding of the No. 0 hundreds coil 0HT9(6) to ground through the lower primary winding of the No. 9 thousands coil 9THT(6) which is located in the tip party field of coils. The signal is reproduced in the secondary winding of coil 9THT(6) and flows over conductors 602, contacts 1 and 2 of tip field switching relay TUF(9), conductors 908, cable 1201, contacts 5 and 6 of thousands switching relay TH(12), conductors 1203, through filter F9(13), and through the primary of input transformer IP9(13). The secondary of transformer IP9(13) feeds amplifier A9(13) which in turn energizes detector D9(13) which thereupon operates detector anode relay D9(13). Register relay OR9(13) now operates in a circuit extending from ground on conductor 1303, over contact 1 of anode relay D9(13), through the winding of register relay OR9(13), to battery (not shown) on conductor 1304. Relay OR9(13), upon operating, locks to battery over its contact 3 under the control of anode relay D9(13) and completes the operating circuit for the No. 9 thousands group register relay (not shown) from ground, over contact 5 of register relay OR0(13), contacts of relays OR1 to OR4 (not shown), contact 6 of relay OR5(13), contacts of relays OR6 to OR8 (not shown), contact 5 of relay OR9(13), contact 2 of thousands switching relay TH(13), conductor 1305, through the winding of the No. 9 thousands group register relay (not shown), conductor 1306, contact 1 of thousands switching relay TH(13), contact 2 of register relay OR9(13), to battery (not shown) over conductor 1307 and cable 1300. The No. 9 thousands group register relay (not shown) operates and locks operated.

Simultaneously with the above operations concerning the identification of the thousands group within which the tip party flat rate subscriber 100 is to be identified, the identifier 1102 has been identifying the thousands group pertaining to the ring party message rate subscriber 200 by a concurrent use of the common number circuit, thereby speeding up considerably the traffic usage of such common number circuit similarly to the above-described concurrent usage of the class circuit. In the case of the identifier 1102, a circuit is completed in identifier 1102 for operating its ring field relays, similar to relays RF1(10) and RF2(10), and the ring field switching relay RUL(9) associated with the last identifier 1102. The latter circuit extends from battery (not shown), over conductor 1123 from the walking relays 1122 of identifier 1102, cable 1124, contact 9 of common number connector MCA2L(9) associated with identifier 1102, to ground through the winding of ring field switching relay RUL(9), which thereupon operates. Relay RUL(9), upon operating, extends the secondary windings of the thousands coils of the ring field (see Figs. 6 and 7), over contacts of relay RUL(9) and over cable 901 to identifier 1102 where apparatus similar to that of identifier 1100 shown in Figs. 12 and 13 will detect and register the thousands group for subscriber 200. The 435-cycle signaling current transmitted over the sleeve conductor 408 of the line finder-selector trunk flows over contact 1 of the relay 307 (which as a result of the party test made by sender 530 is operated for tip parties and not operated, as in the assumed case, for ring parties), conductor 308, brush 202 of line finder 201, terminal 203, conductor 204 of the calling line 200, through resistance 700 and condenser 701, horizontal strip 702 of cross-connecting rack 600, vertical strip 703 to ground through the No. 0 hundreds coil 0HR0(7) and the lower primary winding of the No. 0 thousands coil 0THR(7) in the ring field of such coils. The tone is continued from the secondary of coil 0THR(7), over conductors 704, contacts 9 and 10 of ring field switching relay RUL(9), conductors 909, over cable 901 to identifier 1102 where detectors, responsive only to 435 cycles due to the presence of the band-pass filters such as F9(13) and F5(13) of identifier 1100, detect the presence of the signal and effect the registration in identifier 1102 of the No. 0 thousands group indication. It is, of course, obvious that the thousands group could have been the same as that for the subscriber 100 such that the different identifiers would have been connected to the same thousands coil, say 9THT(6) for instance, in which case there would be no interference between the two identifications because of the mutually exclusive nature of the above-mentioned detector filters.

As a result of the operation of the No. 9 thousands group register relay in identifier 1100, a circuit is completed for operating the preference relay IPF(8), appertaining to the first identifier 1100, of the thousands group connector for the No. 9 thousands group. Relay IPF(8) will operate provided no other identifier has operated its preference relay, such as IPI(8) or IPL(8), beforehand. At this point in the identification process, according to the present arrangement, access to a particular thousands group connector must be restricted to only one identifier at a time, thus the use of preference lockout circuits as fully described by Gooderham. In the assumed cases, since subscriber 100 is to be identified, as regards its hundreds group, tens group, and units designation, in the No. 9 thousands group, and subscriber 200, in the No. 0 thousands group, both identifiers 1100 and 1102 may proceed simultaneously. However, if subscriber 200 were to be identified in the No. 9 thousands group also, either identifier 1100 or 1102 would be excluded from such thousands number circuit until the other one were finished therewith depending upon which preference relay IPF(8) or IPL(8) were operated first.

Relay IPF(8) for the No. 9 thousands number circuit, upon operating, operates the No. 9 thousands group connector relay TH9F(8) in an obvious circuit over contact 4 of relay IPF(8). Relay TH9(8) completes a circuit for the hundreds group identification from the secondary of hundreds coil 0HT9(6), over conductors 603, cable 604, contacts of connector relay TH9F(8), cable 800, contacts of tip field relay TF1(10) or TF2(10), cable 1001, to the contacts of the hundreds switching relay H(12).

HUNDREDS GROUP TEST

In accordance with the detailed description in Gooderham, after the registration in identifier 1100 of the thousands group number 9, the thousands switching relays TH(12) and TH(13) are released along with anode relay D9(13) and register relay 0R9(13) and the hundreds switching relays H(12) and H(13) are operated. The tone signal from hundreds coil 0HT9(6) is thus connected from cable 1001, over conductors 1204, contacts 6 and 7 of hundreds switching relay H(12), conductors 1205 to detector No. 0 where the tone signal is amplified and detected to operate register relay 0R0(13). The operation of relay 0R0(13) completes, over its contacts 1 and 4 and contacts 5 and 6 of hundreds switching relay H(13), an operating circuit for the No. 0 hundreds group register relay (not shown) in series with conductor 1307.

Following the registration of the No. 0 hundreds group, hundreds switching relays H(12) and H(13) are released and tens switching relays T(12) and T(13) are operated preparatory to making the tens test. Also, battery (not shown) is connected to a conductor from the hundreds group register (not shown) over cable 1206 (see Fig. 12), conductor 801, contact 15 of No. 9 thousands group connector relay TH9F(8), conductor 802, to ground through the No. 0 hundreds group connector relay H90(7) of the No. 9 thousands group of such connector relays. Relay H90(7) thereupon operates.

TENS GROUP IDENTIFICATION

Upon the operation of the hundreds group connector relay H90(7), the tone signal on conductor 104 from the calling line is permitted to flow over contact 4 of hundreds group connector relay H90(7), conductor 705, contact 10 of thousands group connector TH9F(8), conductor 803, cable 804, condenser 1207 and resistance 1208, to ground through the primary winding of the tens transformer coil No. 9(12), it being assumed that the tens group for subscribed 100 is 9. The tone signal is continued from the secondary of tens coil No. 9(12) over conductors 1209, cable 1210, contacts 2 and 3 of tens switching relay T(12), conductors 1203, to detector No. 9(13) where it is detected thereby to operate register relay 0R9(13). Relay 0R9(13), upon operating, completes a circuit over its contacts 2 and 5, contacts 1 and 2 of tens switching relay T(13), and conductors 1308 to operate the No. 9 tens group register relay (not shown).

UNITS IDENTIFICATION

Following the registration of the tens group identification, tens switching relays T(12) and T(13) are released and units switching relays U(12) and U(13) are operated. Also, ground is applied from the tens group register relays (not shown) over conductor 1211 (see Fig. 12) to battery through the winding of units connector relay UNCC(12), thereby operating that relay. The tone signal is permitted to flow over contact 5 of relay UNCC(12), through condenser 1212 of the units pad 1213, over conductors 1214, cable 1215, contacts 6 and 7 of units switching relay U(12), conductors 1205 to detector No. 0(13) which detects such signal to thereby effect the operation of register relay 0R0(13), it being assumed that the units group of the calling line 100 is 0. Relay 0R0(13), upon operating, completes, over its contacts 1 and 4, and contacts 5 and 6 of units switching relay U(13), a circuit over conductors 1309 for operating the No. 0 units identifications relay (not shown).

Identifier 1102 goes through the same sequence of operations in testing for and registering the hundreds, tens, and units groups for calling line 200.

All of the foregoing brief outline of the circuit operation incident to hundreds group, tens group, and units identifications are the same as described by Gooderham and reference is made thereto for details not found herein.

TRANSMISSION OF INFORMATION TO SENDER

Upon the completeion of its identification and decoding functions, the identifier, such as identifier 1100 or 1102, transmits various items of information to the sender, such as sender 510, and eventually sender 510 will release identifier 1100 thereby disconnecting such identifier 1100 from both sender 510 and trunk 500. The release of identifier 1100 of course releases all operated equipment therein including such connectors as identifier-trunk connector 513 and sender-identifier connector 512. Such operations do not differ from those described in the Gooderham disclosure. Identifier 1102 will likewise be released in time upon completion of its functions and the transmission of various items of information to sender 530.

COMPLETION OF CONNECTION

The called connection is completed by the sender, such as sender 510, in the manner fully set forth by Gooderham whereupon sender 510 releases along with its sender-trunk finder 511 and the other connectors, such as sender-trunk connector 514, the latter having been used to transmit various items of information to a ticketing device in trunk 500 for the automatic toll ticketing of the call where necessary.

Since the present invention is an improvement over such systems disclosed by Gooderham only with respect to aspects of identification of the calling line number, it is considered unnecessary to set forth details of the system disclosed by Gooderham not necessary to an understanding of such improvement. It is, however, not intended that the scope of the present invention be limited to such systems as disclosed herein for it will be obvious that the spirit and scope of the invention may be applied to other systems.

What is claimed is:

1. In a telephone system, a plurality of calling lines assigned into groups, switching apparatus for extending concurrent conductor connections from conductors of said lines, a plurality of line identifiers, means controlled by different connections for seizing different identifiers and for associating same concurrently with said different extended connections, a source of alternating current in each of said identifiers, the source of current in each identifier being of different frequency than the said sources in others of said identifiers, means in each identifier responsive to its seizure by one of said extended connections to connect its source of current with a conductor of the calling line associated with said one extended connection, circuit means associated with said connections for distinguishing groups within which the said conductors thereof are assigned, means for connecting said seized identifiers concurrently to said circuit means, and means in each identifier controlled by said circuit means and responsive only to current of the frequency applied from its allocated source to the said conductor of the associated connection for identifying the group within which the calling line associated with the said conductor is assigned.

2. In a telephone system, a plurality of calling lines assigned into groups, switching apparatus for extending concurrent conductor connections from conductors of said lines, a plurality of line identifiers, means controlled by different connections for seizing different identifiers and for associating same concurrently with said different extended connections, a source of alternating current in each of said identifiers, the source of current in each identifier being of different frequency than the said sources in others of said identifiers, means in each identifier responsive to its seizure by one of said extended connections to connect its source of current with a conductor of said one extended connection extending back to the calling line associated with said one extended connection, circuit means associated with said calling lines for distinguishing groups within which the said conductors associated therewith are assigned, means for connecting said seized identifiers concurrently to said circuit means, and means in each identifier controlled by said circuit means and responsive only to current of the frequency applied from its allocated source to the said conductor of the associated connection for identifying the group within which the calling line associated with the said conductor is assigned.

3. In a telephone system, a plurality of calling lines assigned into groups, switching apparatus for extending concurrent conductor connections from conductors of said lines, a plurality of line identifiers, means controlled by different connections for seizing different identifiers and for associating same concurrently with said different extended connections, a source of alternating current in each of said identifiers, the source of current in each identifier being of different frequency than the said sources in others of said identifiers, means in each identifier responsive to its seizure by one of said extended connections to connect said source of current with a conductor of said one extended connection extending back to the calling line associated with said one extended connection, grouping means associated with said calling lines for grouping said conductors of calling lines according to said groups, means for connecting said seized identifiers concurrently to said grouping means, and means in each identifier controlled by said grouping means and responsive only to current of the frequency applied from its allocated source to the said conductor of the associated connection for identifying the group within which the calling line associated with the said conductor is assigned.

4. In a telephone system, a plurality of calling lines assigned into groups, switching apparatus for extending concurrent conductor connections from conductors of said lines, a plurality of line identifiers, means controlled by different connections for seizing different identifiers and for associating same concurrently with said different extended connections, a source of alternating current in each of said identifiers, the source of current in each identifier being of different frequency than the said sources in others of said identifiers, means in each identifier responsive to its seizure by one of said extended connections to connect said source of current with a conductor of said one extended connection extending back to the calling line associated with said one extended connection, a circuit common to all of said lines and common to all of said identifiers, said circuit comprising means for grouping said conductors of all lines according to groups and distinguishing means for each group energized by alternating current applied to a conductor of any line of said group, means in each identifier for connecting said identifier to said common circuit concurrently with others of said identifiers, and means in each identifier controlled by said common circuit and responsive to energization of said distinguishing means thereof only by current of the frequency applied from its allocated source to the said conductor of the associated connection for identifying the group within which the calling line associated with the said conductor is assigned.

5. In a telephone system, a plurality of calling lines assigned into groups, each group divided into subgroups, the last subgroup divided into units, switching apparatus for extending concurrent conductor connections from conductors of said lines, a plurality of line identifiers, means controlled by different connections for seizing different identifiers and for associating same concurrently with said different extended connections, a source of alternating current in each of said identifiers, the source of current in each identifier being of different frequency than the said sources in others of said identifiers, means in each identifier responsive to its seizure by one of said extended connections to connect said source of current with a conductor of said one extended connection extending back to the calling line associated with said one extended connection, a first circuit common to all of said lines and common to all of said identifiers, said first circuit comprising means for grouping said conductors of all lines according to groups and distinguishing means for each group energized by alternating current applied to a conductor of any line of said group, means in each identifier for connecting said identifier to said first common circuit concurrently with others of said identifiers, means in each identifier controlled by said common circuit and responsive to energization of said distinguishing means thereof only by current of the frequency applied from its allocated source to the said conductor of the associated connection for identifying the group within which the calling line associated with the said conductor is assigned, a second circuit for each group and common to all identifiers, means in each identifier responsive to the group identification for connecting said identifier to the indicated second circuit for identifying the subgroup and unit thereof to which the associated line is assigned, and means controlled by said second circuits for enabling said identifiers to connect concurrently to different second circuits.

6. In a telephone system, a plurality of line circuits, circuit means common to all line circuits for grouping said line circuits into groups according to an identification feature common to all line circuits in a group, switching means for extending concurrent connections from a plurality of said line circuits in a calling condition, a plurality of identifiers, means controlled by different extended connections for associating different identifiers concurrently with different connections and with said common grouping means, a source of signal potential in each identifier, means in each identifier responsive to its association with one of said connections and with said common grouping means to apply potential from its source to the associated connection, means in said grouping means responsive to any of said potentials applied to any of said connections for indicating group identification of any potential energized line circuit, and means in each identifier selectively responsive to such indicating means for ascertaining only the group identification caused by its own potential.

7. In a telephone system a plurality of line circuits, means common to all circuits for grouping said circuits into groups according to an identification feature common to all circuits in a group, switching means for extending concurrent connections from a plurality of said circuits in a calling condition, a plurality of identifiers, means controlled by different extended connections for associating different identifiers concurrently with different connections and with said common grouping means, a source of alternating current in each identifier, the source of current in each identifier being of different frequency than the said sources in others of said identifiers, means in each identifier responsive to its association with one of said connections and with said common grouping means to apply current from its source to the associated connection, means in said grouping means responsive to any of said current frequencies applied to any of said connections for indicating group identification of any frequency energized line circuit, and means in each identifier selectively responsive to such indicating means for ascertaining only the group identification caused by its own particular frequency.

8. In a telephone system, a plurality of line circuits, circuit means connected to and common to all line circuits for grouping said line circuits into groups according to an identification feature common to all line circuits in a group, switching means for extending concurrent connections from a plurality of said line circuits in a calling condition, a plurality of identifiers, means controlled by different extended connections for associating different identifiers concurrently with different connections and with said common grouping means, a source of alternating current in each identifier, the source of current in each identifier being of different frequency than the said sources in others of said identifiers, means in each identifier responsive to its association with one of said connections and with said common grouping means to apply current from its source to the associated connection, circuit means in said grouping means responsive to any of said current frequencies applied to any of said connections for indicating group identification of any frequency energized line circuit, and means in each identifier selectively responsive to such indicating means for ascertaining only the group identification caused by its own particular frequency.

FOSTER B. BLAKE.

REFERENCES CITED

The following references are of record in the file of this patent:

UNITED STATES PATENTS

| Number | Name | Date |
|---|---|---|
| 2,387,897 | Grandstaff | Oct. 30, 1945 |
| 2,454,770 | Cabes | Nov. 30, 1948 |
| 2,471,415 | Deakin | May 31, 1949 |

FOREIGN PATENTS

| Number | Country | Date |
|---|---|---|
| 602,927 | Great Britain | June 4, 1948 |